United States Patent
Bryant et al.

(10) Patent No.: US 10,135,751 B2
(45) Date of Patent: *Nov. 20, 2018

(54) AUTOMATED SPLIT OF WORK IN A CLOUD ENVIRONMENT

(71) Applicant: International Business Machines Corporation, Armonk, NY (US)

(72) Inventors: Jay S. Bryant, Rochester, MN (US); Bin Cao, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/946,997

(22) Filed: Nov. 20, 2015

(65) Prior Publication Data

US 2016/0323373 A1 Nov. 3, 2016

Related U.S. Application Data

(63) Continuation of application No. 14/701,324, filed on Apr. 30, 2015.

(51) Int. Cl.
*H04L 12/911* (2013.01)
*H04L 29/08* (2006.01)

(52) U.S. Cl.
CPC ............ *H04L 47/781* (2013.01); *H04L 47/70* (2013.01); *H04L 67/1008* (2013.01); *H04L 67/1014* (2013.01)

(58) Field of Classification Search
CPC .......................... H04L 47/781; H04L 67/1008

USPC ........................................................... 709/226
See application file for complete search history.

(56) References Cited

U.S. PATENT DOCUMENTS

| | | | |
|---|---|---|---|
| 2012/0054332 A1* | 3/2012 | Sahu | G06F 9/5088 709/224 |
| 2012/0297249 A1* | 11/2012 | Yang | G06F 9/5072 714/19 |
| 2013/0103837 A1* | 4/2013 | Krueger | G06F 9/5072 709/226 |
| 2013/0198318 A1 | 8/2013 | Branson et al. | |
| 2013/0283266 A1* | 10/2013 | Baset | G06F 9/485 718/1 |

(Continued)

OTHER PUBLICATIONS

Schneider et al.; "Elastic Scaling of Data Parallel Operations in Stream Processing", Parallel & Distributed Processing, 2009. IPDPS 2009. IEEE International Symposium on; May 23-29, 2009; pp. 1-12.

(Continued)

*Primary Examiner* — Wing F Chan
*Assistant Examiner* — Leon Y Tseng
(74) *Attorney, Agent, or Firm* — Patterson + Sheridan, LLP

(57) ABSTRACT

Techniques disclose managing cloud computing resources provisioned to processing elements of a distributed application (e.g., for a streams processing environment). A cloud manager determines changes in availability of cloud resources. The cloud manager notifies a runtime manager of a distributed application of the change in availability. The runtime manager in turn requests that the cloud manager adjust the provisions based on the notification. The cloud manager provisions the cloud resources based on the request.

9 Claims, 6 Drawing Sheets

(56) References Cited

U.S. PATENT DOCUMENTS

2014/0282604 A1* 9/2014 Jacobson ............... G06F 9/461
 718/107
2014/0355438 A1 12/2014 Gedik et al.

OTHER PUBLICATIONS

IBM "List of IBM Patents or Patent Applications Treated as Related".
U.S. Appl. No. 14/701,324, entitled Automated Split of Work in a Cloud Environment, filed Apr. 30, 2015.

* cited by examiner

AUTOMATED SPLIT OF WORK IN A CLOUD ENVIRONMENT

CROSS-REFERENCE TO RELATED APPLICATIONS

This application is a continuation of co-pending U.S. patent application Ser. No. 14/701,324, filed Apr. 20, 2015. The aforementioned related patent application is herein incorporated by reference in its entirety.

BACKGROUND

Embodiments presented herein generally relate to cloud computing, and more specifically to splitting workloads among processing elements executing in a cloud computing environment.

A cloud computing environment provides computing resources, such as services, processing resources, and storage capacity from large pools of physical computing systems. For example, the cloud computing environment may spawn a number of virtual machine instances on-demand for a given purpose, such as in a streams processing environment.

A streams processing environment may use the large amount of computing resources afforded by a cloud environment. In a streams processing environment, a distributed application receives large amounts (or "streams") of input data, such as text messages, image data, and the like. Processing elements of the distributed application analyze the data through a series of operators, each operator serving a particular purpose. For example, one operator may filter certain data from a stream and pass the filtered data to another operator that evaluates the data for specified values. Further, based on the amount of incoming data, the distributed application may split a given operator among shared resources (e.g., other virtual machines) so that the resulting operators each perform a part of the original task. Splitting operators allows the distributed application to parallelize a given workload.

In the cloud computing environment, resources can become available and unavailable at any given time, e.g., due to implementation of the cloud computing environment, contractual agreements between the owner of the cloud and the end user, and the like. As a result, to effectively manage workloads processed in the streams runtime environment, an administrator needs to be aware of changes to resources in the cloud environment.

SUMMARY

One embodiment presented herein describes a method. The method generally includes determining a change in availability of cloud resources in a cloud computing environment. The method also includes notifying a runtime manager of the change in availability. The runtime manager distributes a workload to a distributed application executing in the cloud computing environment. In response to the notification, a request from the runtime manager is received to adjust provisions of the cloud resources to the distributed application. The cloud resources are provisioned based on the request.

DETAILED DESCRIPTION

Figure 1:
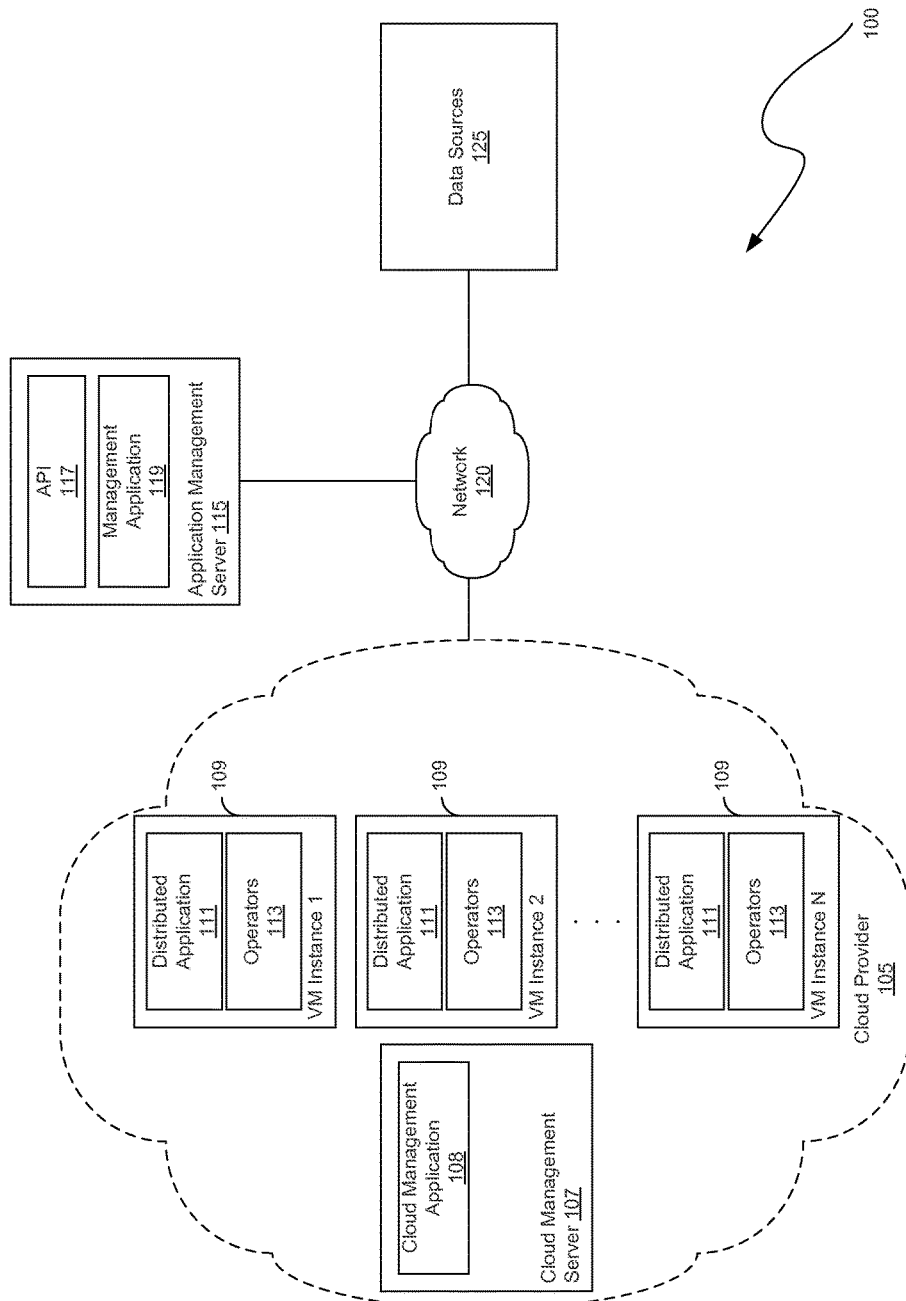
FIG. 1 illustrates an example computing environment, according to one embodiment.

Embodiments presented herein describe techniques for managing workloads in a distributed runtime environment hosted by a cloud provider. The runtime environment may include a cluster of computing nodes (e.g., virtual machine instances) in a cloud computing environment. Each computing node executes a distributed application that retrieves and analyzes massive amounts of input data. Further, each computing node may include operators that are each configured to perform some task in relation to a given workload in the runtime environment. For example, a given operator parses input text data, while another operator identifies specified terms from the parsed data.

At times, computing nodes in the cloud computing environment may become available and unavailable. If additional nodes become available, the runtime environment can spread the distribution of operator tasks across the additional nodes, e.g., through a split operation. A split operation allows an assigned task for an operator to be divided into smaller tasks for multiple operators to perform. Further, if nodes go offline, the runtime environment can rejoin split tasks into a given operator to adjust to the change in available cloud resources.

In one embodiment, a cloud manager monitors available cloud resources. The cloud manager detects changes in available cloud resources, e.g., when additional resources become available or unavailable. The cloud manager may notify the application manager of the change in resources. The application manager can then use such information to determine whether to adjust a current configuration of the runtime environment. For instance, if the cloud manager notifies the application manager of additional resources, the application manager may determine, based on a current configuration of the runtime environment (e.g., operation configuration, current workloads, etc.) whether to request additional cloud resources from the cloud manager. Once provisioned, the application manager can redistribute workloads across the newly provisioned resources, such as by performing a split operation on one or more operators. As another example, if the cloud manager notifies the application manager that a number of nodes have gone offline, then the application manager may redistribute the workloads over the remaining nodes, such as by rejoining previously split operator workloads.

Advantageously, embodiments presented herein allow an application manager of a distributed runtime environment to automatically redistribute one or more workloads based on changes to available resources. Because the cloud manager communicates available resources to the application manager, the application manager can evaluate a current configuration of the runtime environment relative to the changes in resources to determine whether to, e.g., split workloads across other operators or to scale back workloads to fewer operators.

Note, the following uses a streams application environment as an example of a runtime environment executing in a cloud network that automatically redistributes a workload based on changes in resources, as communicated by a cloud manager. However, one of skill in the art will recognize that embodiments described herein may be adapted to various runtime environments that manage a distribution of workloads over multiple computing nodes.

FIG. 1 illustrates an example computing environment 100, according to one embodiment. As shown, computing environment 100 includes a cloud provider 105, an application management server 115, and data sources 125, each connected via a network 120.

In one embodiment, the cloud provider 105 itself includes a cloud management server 107 and a number of virtual machine (VM) instances 109. The cloud management server 107 includes a management application 108. The cloud provider 105 may spawn a number of VM instances on behalf of a given subscriber. For example, a streams runtime environment for a distributed application 111 can execute on the multiple VM instances 109. In one embodiment, the distributed application 111 retrieves massive amounts of input data from data sources 125 and analyzes the input data in real-time. For example, the input data corresponds to message data that is pulled from various data sources 125. The distributed application 111 analyzes the data using multiple operators 113. Each operator 113 performs a task related to a given workload. For instance, a given operator 113 may parse text data and pass the data onto another operator 113. In turn, the other operator 113 may count an amount of instances that a specified term appears in the text data and pass the result and the parsed text to another operator 113. Another operator 113 receives the text and the count information and filters out terms that do not exceed a given threshold. The operators 113 may be distributed across the VM instances 109.

As shown, the application management server 115 includes an application programming interface (API) 117 and a management application 119. The management application 119 distributes operators 113 across VM instances 109 provisioned to the streams runtime environment. The management application 119 may determine such a distribution based on operator attributes (assigned task for a given workload, processing requirements for the workload, etc.). The management application 119 also determines, based on a current load on cloud resources provisioned to the runtime environment, whether to split a task to be performed by multiple operators that may be executing on different VM instances.

In one embodiment, the management application 108 monitors cloud resources, such as physical computing systems, storage resources, and processing resources. The management application 108 may determine the availability of the cloud resources. Further, the management application 108 may spawn one or more of the VM instances 109 based on availability of the cloud resources. The management application 108 notifies the management application 119 of changes to cloud resources. For instance, if additional resources become available, the management application 108 communicates the change in availability to the management application 119. In turn, the management application 119 evaluates current operator attributes. Doing so allows the management application 119 to determine whether to request additional cloud resources (e.g., VM instances 109) to be provisioned to the streams runtime environment. The management application 119 may then request the additional resources. Once provisioned, the management application 119 may split operator tasks across the additional resources.

Figure 2:
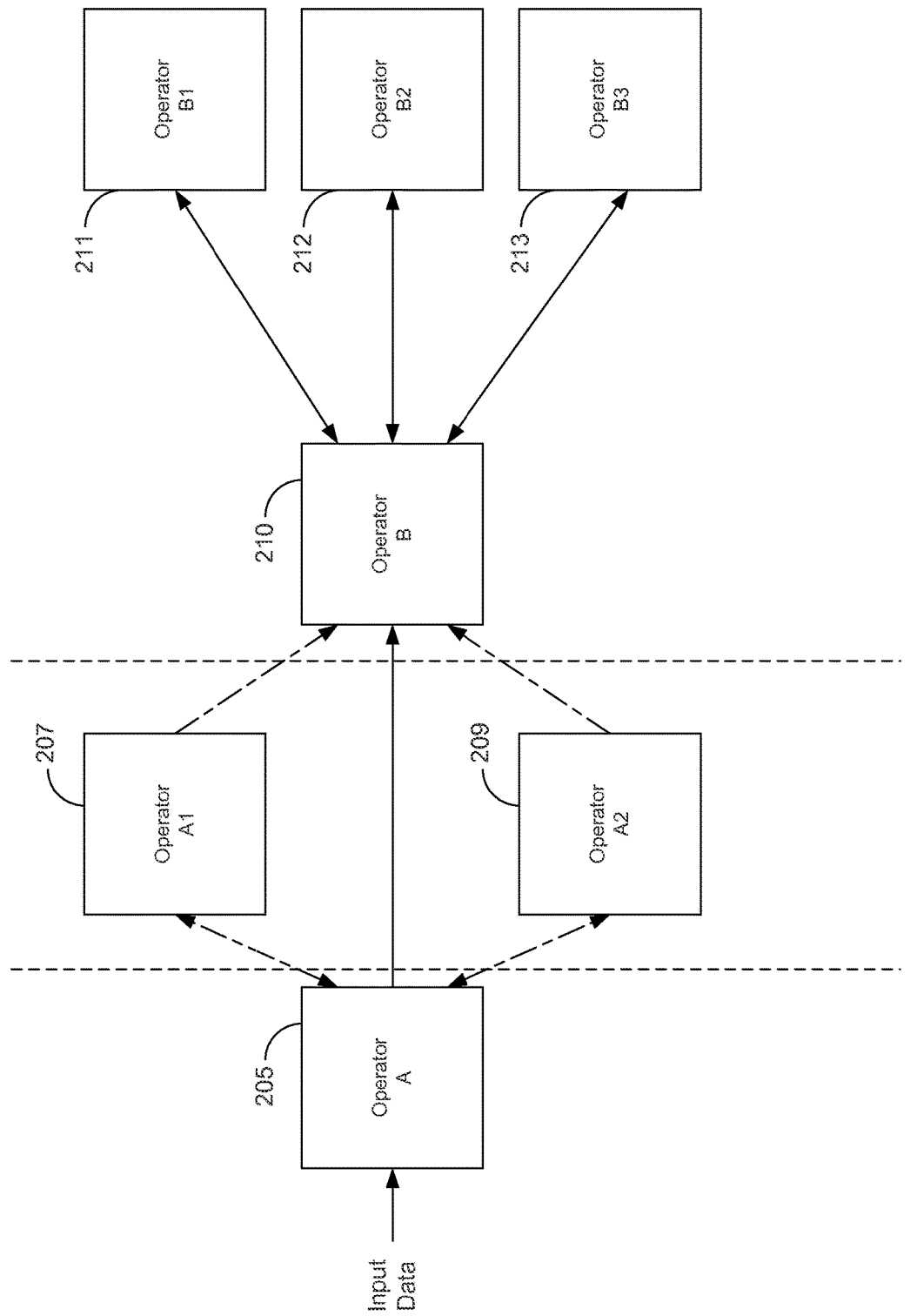
FIG. 2 illustrates an example operator split, according to one embodiment.

FIG. 2 illustrates an example operator split operation, according to one embodiment. Illustratively, FIG. 2 depicts input data being processed through operators A (205) and B (210). Generally, operator A 205 receives input data from one or more data sources and performs a specified task. Once performed, the operator A 205 can forward resulting data (e.g., results of the processing, the original data, etc.) to operator B 210. In turn, operator B 210 performs a specified task using the data received from operator A 205. Operator B 210 may then send resulting data to a specified operator within the streams runtime environment for further processing. As stated, operators within the streams runtime environment may execute a pool of VM instances hosted by a cloud provider. Further, a given node may execute multiple operators in the streams runtime environment.

In one embodiment, the management application 119 may redistribute operators based changes in availability of cloud resources provisioned to the streams runtime environment and based on a current configuration of operators in the environment. The cloud management application 108 communicates changes to the availability of cloud resources. In turn, the management application 119 evaluates operator attributes, such as operators distributed across the pool of VM instances, to determine whether to request additional or fewer resources from the cloud provider.

In addition, the management application 119 also determines whether to request additional or fewer resources based on other factors, such as a minimum number of VM instances over which to distribute operator workloads, a maximum number of VM instances over which to distribute the operator workloads, etc. For instance, if the cloud management application 108 communicates an increase in availability of cloud resources, the management application 119 may determine whether the streams runtime environment is using a maximum number of VM instances. If not, then the management application 119 may request that the cloud management application 108 provision additional VM instances. The management application 119 may then redistribute operator workloads. For example, as illustrated, the management application 119 can split operator A 205 into two operators: operator A1 207 and operator A2 209. Each of operator A1 207 and operator A2 209 perform half of the original task allotted to operator A 205. The management application 119 may distribute each operator based on the new provisions of VM instances in the streams runtime environment. As another example, the management application 119 can split operator B 210 into three operators: operator B1 211, operator B2 212, and operator B3 213.

Further, the management application 119 can rejoin split operators into a single operator based on a decrease in available resources. For example, a decrease in available resources may occur if nodes go offline or if the streams runtime environment has exceeded a specified maximum amount of VM instances over which to distribute operator workloads. At any rate, the management application 119 may merge split operators together (e.g., operators A1 207 and A2 209 into operator A 205).

Figure 3:
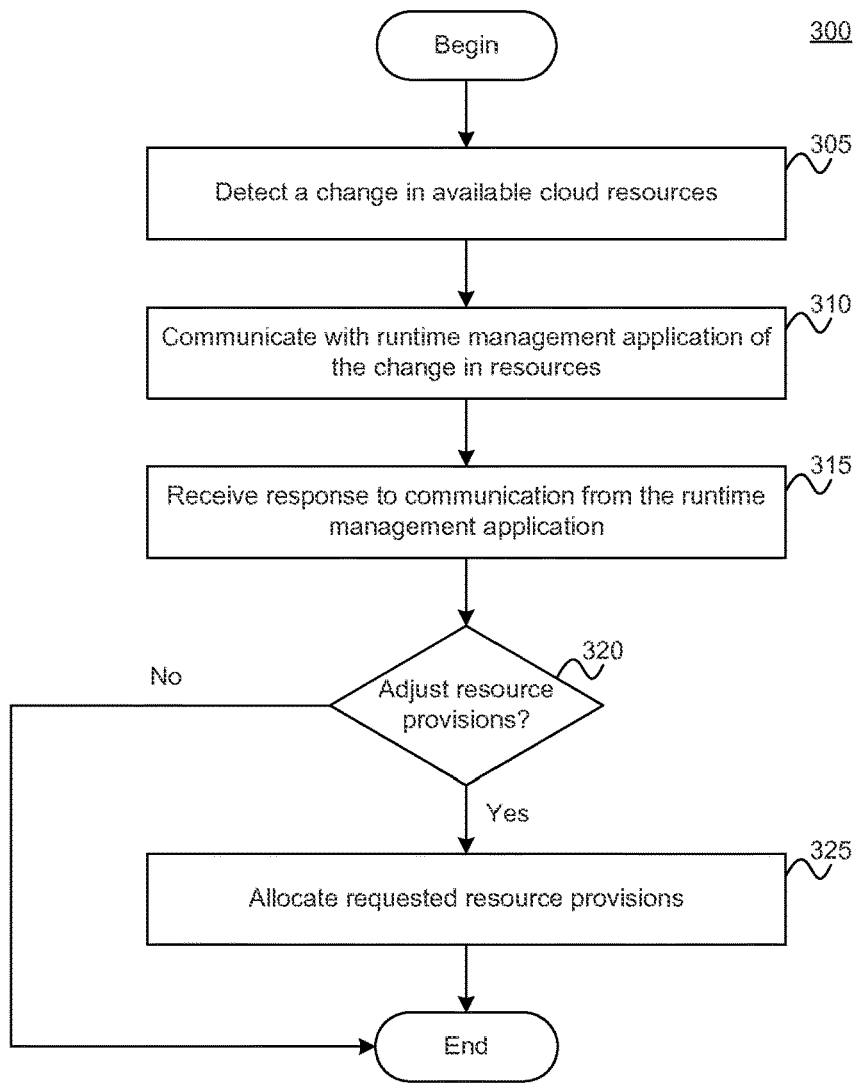
FIG. 3 illustrates a method for allocating cloud resources to a streams application, according to one embodiment.

FIG. 3 illustrates a method 300 for managing cloud resources, according to one embodiment. As shown, method 300 begins at step 305, where the cloud manager application 108 detects a change in available cloud resources, such as processing, memory, storage, network bandwidth, virtual machines, etc. For example, the cloud manager application 108 may identify an increase in available resources.

At step 310, the cloud manager application 108 communicates the change in resources to the management application 119. In turn, the management application 119 may determine whether to request additional (or fewer) resources to be provisioned to the streams runtime environment. For example, the management application 119 may determine to request additional virtual machine instances used to host processing elements.

At step 315, the cloud management application 108 receives a response from the management application 119. The response indicates whether to adjust an amount of currently provisioned resources to the streams runtime environment. At step 320, the cloud management application 108 determines, based on the response, whether to adjust the provisions. For example, the response may indicate to the cloud management application 108 to increase an amount of VM instances for the streams runtime environment. If so, then at step 325, the cloud management application 108 allocates the requested resource provisions. If not, then method 300 ends.

Figure 4:
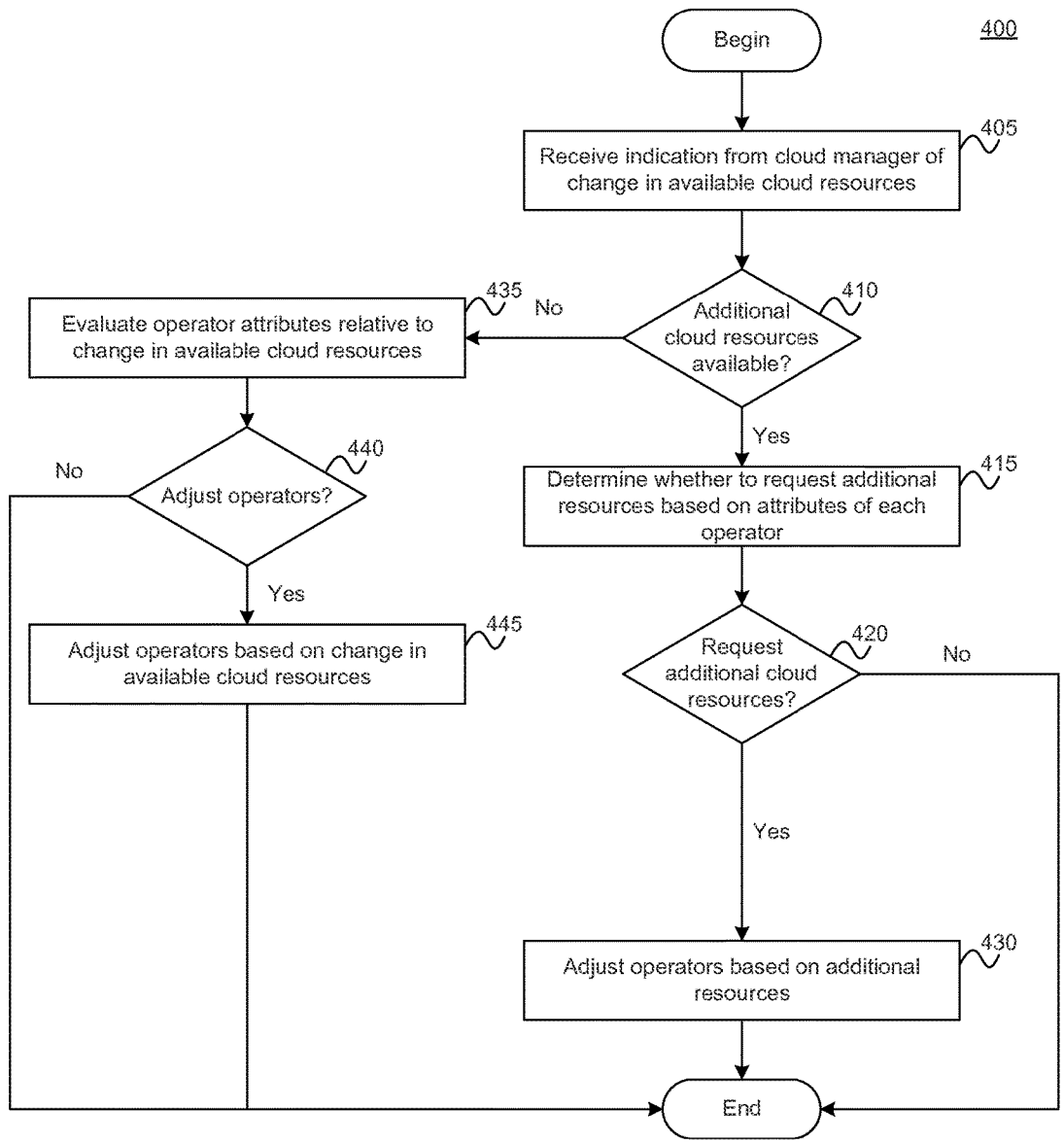
FIG. 4 illustrates a method for managing operators in a streams environment, according to one embodiment.

FIG. 4 illustrates a method 400 for managing a distribution of operator workloads across a streams runtime environment, according to one embodiment. As shown, method 400 begins at step 405, where the management application 119 of the streams runtime environment receives an indication from the cloud manager application 108 of a change in available cloud resources.

At step 410, the management application 119 determines, based on the indication, whether the change in resources is an increase in available cloud resources. If so, then at step 415, the management application 119 determines whether to request additional resources. To do so, the management application 119 evaluates a current configuration and distribution of operators in the streams runtime environment. For example, the management application 119 can determine whether an amount of VM instances currently provisioned to the runtime environment is under a specified minimum amount or exceeds a specified maximum amount.

Based on this determination, the management application 119 can request additional cloud resources (at step 420). In such a case, the management application 119 requests the cloud resources from the cloud application manager 118. In turn, the cloud application manager 118 provisions additional VM instances. At step 430, the management application 119 adjusts the distribution of operators based on the newly provisioned resources. For instance, the management application 119 may perform a split operation on a given operator and execute one or more of the resulting operators on a new virtual machine instance.

In one embodiment, if the change in available cloud resources is a decrease in resources (e.g., a node in the cloud network goes offline), then at step 435, the management application 119 evaluates a current configuration and distribution of operators relative to the change. For example, the management application 119 can identify previously split operators to merge based on the overall distribution of operators among provisioned cloud resources. At step 440, the management application 119 determines whether to adjust the distribution of operators based on the evaluation. If so, then at step 445, the management application 119 adjusts the distribution. If not, then method 400 ends.

Figure 5:
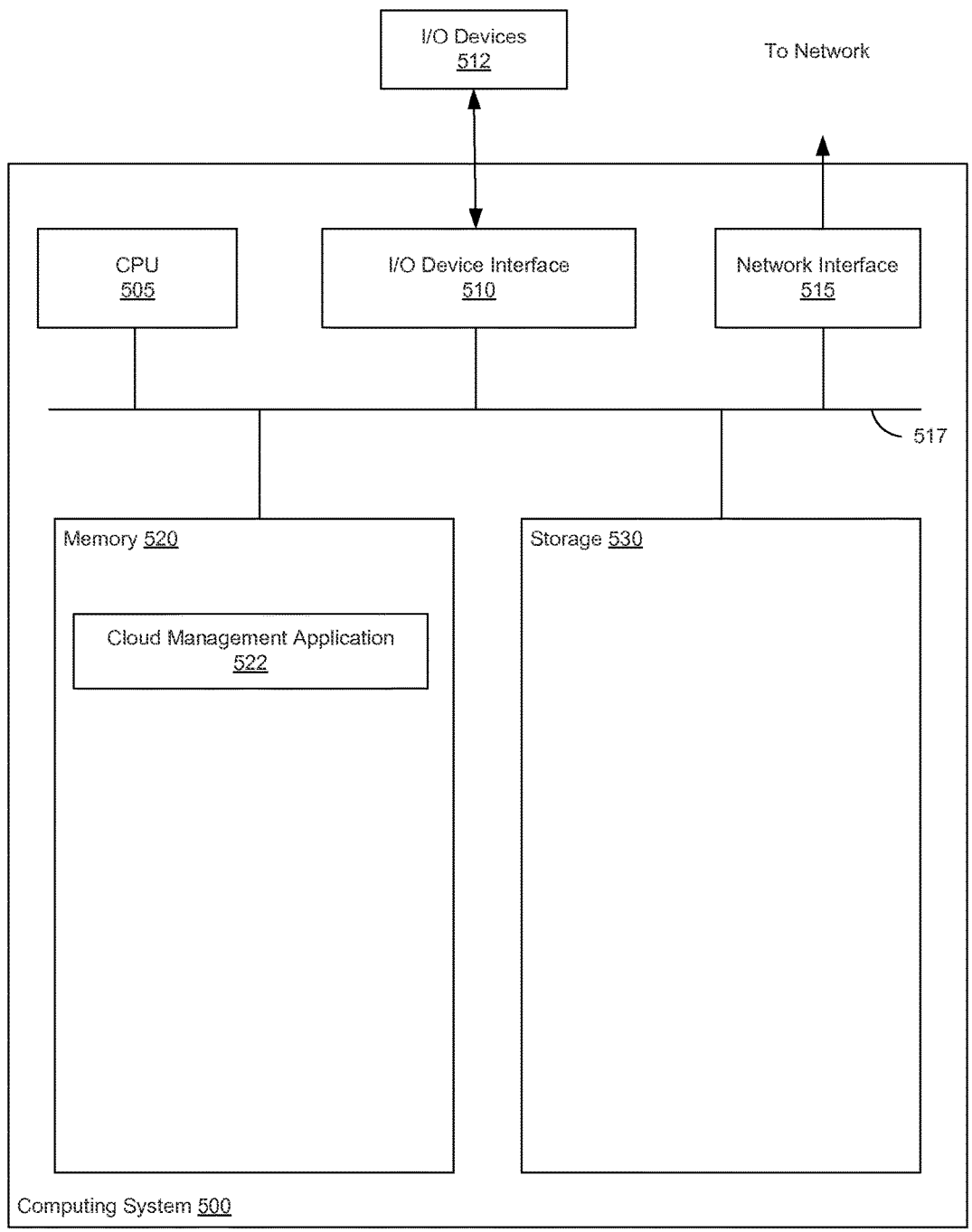
FIG. 5 illustrates a computing system configured to allocate cloud resources to a streams application, according to one embodiment.

FIG. 5 illustrates a computing system 500 configured to manage cloud resources, according to one embodiment. As shown, the computing system 500 includes, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in the computing system 500 may correspond to a physical computing system.

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 517, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes a cloud management application 522. The management application 522 monitors cloud resources, such as physical computing systems, storage resources, and processing resources. Further, the cloud management application 522 spawns one or more of virtual machine instances based on availability of cloud resources. In one embodiment, the cloud management application 522 notifies a management application of a streams runtime environment of changes to cloud resources. The management application of the runtime environment may determine whether to request additional or fewer resources based on such changes. In turn, the cloud management application 522 provisions the cloud resources to the runtime environment accordingly.

Figure 6:
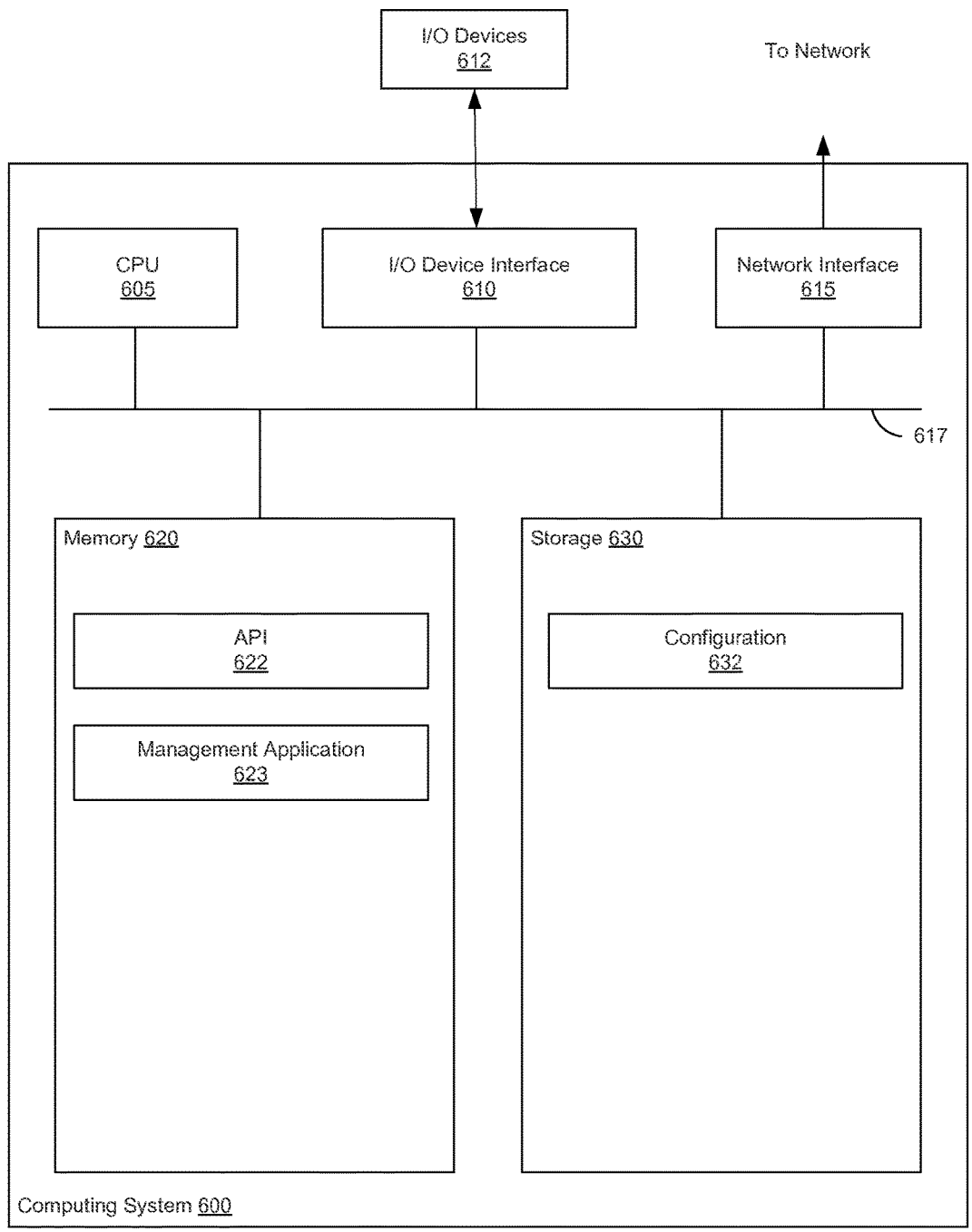
FIG. 6 illustrates a computing system configured to manage operators in a streams environment, according to one embodiment.

FIG. 6 illustrates a computing system 600 configured to manage operator workloads in a streams runtime environment, according to one embodiment. As shown, the computing system 600 includes, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in the computing system 600 may correspond to a physical computing system.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application programming interface (API) 622 and a management application 623. And storage 630 includes a configuration 632. The management application 623 controls a distribution of operators across multiple virtual machine instances for a streams runtime environment. The management application 623 may determine such a distribution based on operator attributes (assigned task for a given workload, processing requirements for the workload, etc.). The management application 623 also determines, based on a current load on cloud resources provisioned to the runtime environment, whether to split a task to be performed by multiple operators that may be executing on different VM instances.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a runtime management application or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   determining a first change in availability of cloud resources in a cloud computing environment, wherein the first change comprises an increase in available cloud resources within the cloud computing environment;
   notifying a runtime manager of the first change in availability, wherein the runtime manager distributes a workload to a distributed application executing in the cloud computing environment, and wherein the distribution application comprises a plurality of operators executing in the cloud computing environment, wherein each of the plurality of operators is configured to perform a respective one or more operations on incoming data, and wherein at least a first one of the plurality of operators is configured to process data that is output by at least a second one of the plurality of operators;
   receiving, in response to the notification, a request from the runtime manager to adjust provisions of the cloud resources to the distributed application based on the determination that the first change comprises an increase in available cloud resources within the cloud computing environment, and
   in response to receiving the request:
      provisioning a new virtual machine instance,
      identifying a third operator of the plurality of operators, the third operator configured to perform a plurality of operations on the incoming data, and
      creating two or more new operators, wherein the two or more new operators are configured to collectively perform the plurality of operations on the incoming data, wherein at least one of the two or more new operators is configured to execute on the new virtual machine instance, and wherein each operation of the plurality of operations is assigned to only one of the two or more operators.

2. The method of claim 1, further comprising:
   determining a second change in availability of cloud resources in a cloud computing environment, wherein the second change comprises a decrease in available cloud resources within the cloud computing environment;
   notifying a runtime manager of the second change in availability, wherein the runtime manager distributes a workload to a distributed application executing in the cloud computing environment;
   receiving, in response to the notification, a request from the runtime manager to adjust provisions of the cloud resources to the distributed application; and
   adjusting an allocation of cloud resources to the distributed application based on the request by rejoining two or more previously split operators into one operator.

3. The method of claim 2, wherein the distributed application includes one or more processing elements performing tasks of the workload, and wherein the processing elements are distributed across the provisioned cloud resources.

4. The method of claim 2, wherein the provisioned cloud resources includes one or more virtual machine instances.

5. The method of claim 2, wherein the distributed application is a streams processing application.

6. The method of claim 2, wherein the operators to split and rejoin are determined based on the assigned task for a given workload.

7. The method of claim 2, wherein the operators to split and rejoin are determined based on processing requirements for the workload.

8. The method of claim 2, wherein at least one of the plurality of operators filters data from a stream and at least one of the plurality of operators evaluates the filtered data.

9. The method of claim 3, wherein the split operators are distributed across the provisioned cloud resources.

* * * * *